Jan. 15, 1957 J. C. OWEN ET AL 2,777,946
ELECTRONIC INTEGRATOR
Filed April 12, 1952
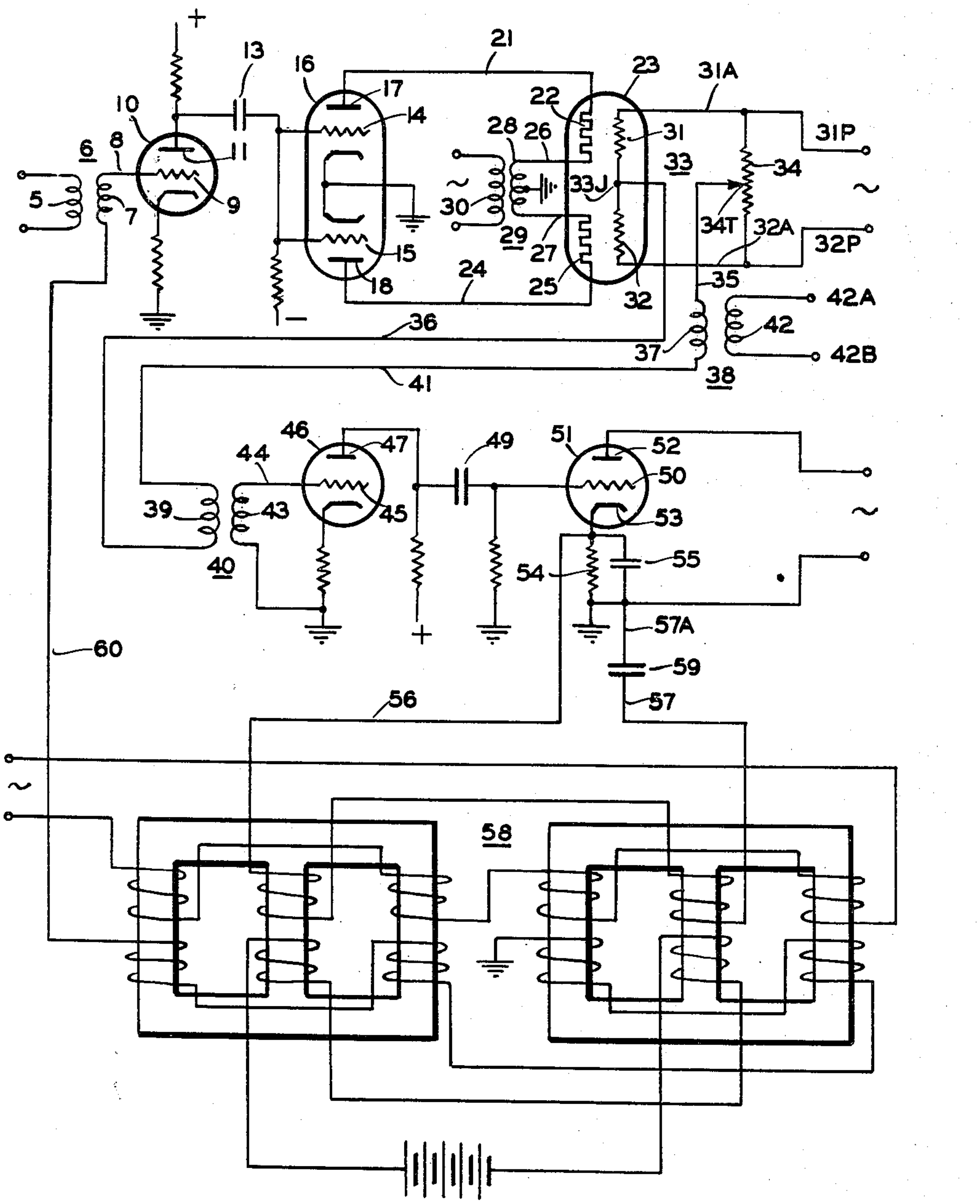
INVENTORS
JOHN C. OWEN
ALFRED BENNETT
BY
ATTORNEY United States Patent Office 2,777,946

Patented Jan. 15, 1957

2,777,946

ELECTRONIC INTEGRATOR

John C. Owen, Palisades Park, N. J., and Alfred Bennett, Bronx, N. Y., assignors to Bendix Aviation Corporation, Teterboro, N. J., a corporation of Delaware Application April 12, 1952, Serial No. 282,054

9 Claims. (Cl. 250—27)

The present invention is concerned with an electrical circuit for performing linear integration and more particularly an electronic circuit that produces an output voltage which is the product of the input voltage and time, that is, the rate of increase of the output is a direct function of the summation of the input during a period of time persistence.

The usual types of electronic integration circuits deal with relatively high frequencies, usually 60 or more cycles and are, therefore, concerned with time constants in the orders of milliseconds and microseconds. Integrations involving time constants of seconds or minutes in persistence have formerly been performed mechanically by the use of motor and gear trains or similar devices. Mechanical integrating devices are by their very nature slow in operation, complicated in construction, expensive to manufacture, and difficult to keep in adjustment.

One practical application for integrating circuits, such as the novel circuit of the present invention, is found in the stabilization network or damping system of servomechanism. The purpose of damping is to reduce the amplitude and the deviation of the transient error between the instantaneous actual position of the output member and the position called for by the input member. A transient error occurs whenever the system is disturbed from its prevalent operating condition. The damping is not obtained, however, without disadvantages. Viscous output damping produces a steady-state error. A differentiating network, showing the rate of change in error requires added amplifier gain and may result in an increase in the natural frequency of oscillation of the system. Integration networks are generally used in connection with the above mentioned damping methods to reduce the error of the system without appreciably raising the natural frequency, yet still increasing the controller gain and torque. Integral controls are particularly valuable in cases where heavy external load demands on the system are encountered.

In a differentiating network the output is the linear function of the time rate of change of error or expressed mathematically $$o=\frac{de}{dt}$$

where $o$ is the output, $e$ is the error, and $t$ is the unit of time. In an integration network, on the other hand, the output is a linear function of a summation of inputs, i. e., a time integral of the error which is expressed mathematically as $o=\int edt$ where $o$ is the output, $e$ is the error, and $t$ the unit of time. Accordingly, if, for example, the input to the novel circuit represents the rate of change of a function, then the output represents the displacement of that function; or if the input to the novel circuit represents the acceleration of a function then the output of the novel circuit represents the rate of change of the function.

An object of the present invention, therefore, is to provide a novel electronic integrating circuit in which mathematical operations are rapidly performed.

Another object of the present invention is to provide a novel electronic integrating circuit whose output is the true integral of the input.

Still another object is to provide a novel electronic circuit capable of performing linear integrations involving time constants which are of an extent of time persistence not obtainable by the heretofore known types of electronic integrating circuits.

A further object is to provide a novel electronic circuit capable of performing linear integrations involving time constants of the order of seconds and minutes in persistence.

A still further object is to provide a novel electronic circuit capable of performing linear integrations involving time constants which compare favorably with the results obtained from mechanical integrating devices.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

The single figure of the drawing is a complete schematic wiring diagram illustrating the electrical apparatus and connections employed in the electronic integrating circuit of the present invention.

Referring now to the drawing, the input potential from the signal source is impressed upon the primary winding 5 of an input transformer 6. One terminal of the secondary winding 7 of the input transformer 6 is connected by means of a lead 8 to the grid 9 of high gain amplifier tube 10. The amplified signal from plate 11 of tube 10 is communicated through a by-pass condenser 13 to the grids 14 and 15 of a phase discriminating tube 16.

A plate 17 of the discriminator tube 16 is connected by means of a lead 21 to the heater element 22 of thermal time delay device 23. A plate 18 similarly is connected by means of lead 24 to the heater element 25 of thermal device 23. Heater elements 22 and 25 are connected by means of leads 26 and 27 to the respective end terminals of the grounded center-tapped secondary winding 28 of a transformer 29. Transformer 29 provides the supply source of potential for plates 17 and 18 of discriminator tube 16. The primary winding 30 of the transformer 29 is energized from a suitable source of alternating current potential.

Thermal device 23, which may be of the type described in U. S. Patent 2,463,805, granted March 8, 1949, comprises a sealed tube having mounted therein a pair of resistors 31 and 32 arranged in a heat exchange relation with the heater elements 22 and 25, respectively. The resistors 31 and 32 are connected together at a common junction 33J so as to constitute two adjacent arms of a normally balanced resistance bridge circuit 33. The other two adjacent arms of the bridge circuit 33 are outside of the sealed tube of thermal device 23. One external arm comprises that portion of a center-tapped resistor 34 from tap 34T to its junction with free terminal 31A. The other arm comprises that portion of resistor 34 from tap 34T to its junction with free terminal 32A. Bridge energization from a suitable source of alternating current potential is applied by way of leads 31P and 32P across the diagonal formed by the junction of the respective end terminals of resistor 34 with resistors 31 and 32.

The input signal impressed upon the primary winding 5 of the input transformer 6 is amplified by the high gain amplifier tube 10. The amplified signal is then applied to the grids 14 and 15 of a phase discriminator tube 16 which operates as a selective switch responsive to the phase of the signal applied to its grids. At zero input signal potential, the grids 14 and 15 of the discriminator tube 16 are negatively biased to a degree so as to permit the flow of sufficient plate current through heater elements 22 and 25 to develop a heating of these elements to the mid-point temperature of their usable range. Tube 10 is a high gain amplifier so any appreciable input signal potential applied to its grid 9 is amplified to such a magnitude as to neutralize the negative bias applied to grids 14 and 15. Since the signal is A. C., this will cause one plate to operate at its maximum and the other plate to become non-conductive. The phase of the input signal potential determines whether plate 17 or plate 18 remains conductive to pass current through either heater elements 22 or 25. Upon the neutralization of the negative bias applied to grids 14 and 15, the amount of current flowing through either plate 17 or 18 is determined by the amount of plate potential. Since any appreciable signal operates the plate at its maximum, the amount of plate current is, therefore, not responsive to the magnitude of the input signal potential applied to the grid 9 of amplifier tube 10.

The increase in temperature developed by the heater element of thermal device 23 that is carrying maximum plate current and the decrease in temperature resulting in the heater element that is carrying no plate current slowly develops a differential between the resistance values of the resistors 31 and 32. This differential unbalances bridge circuit 33; consequently, a bridge voltage appears across the diagonal of the bridge circuit formed by the center tap 34T of resistor 34 and the junction 33J of resistors 31 and 32 inside the tube 23. The bridge voltage slowly and progressively builds up to a maximum value with the passage of a period of time.

The maximum value that the bridge voltage may attain depends upon the circuit elements. The maximum limit may be varied for different uses by varying the circuit elements or by amplification. The maximum limit is constant, however, for a given set of circuit elements and is independent of the input signal potential. The build-up time of the bridge voltage, discussed above, depends upon the characteristics of thermal device 23. The thermal time delay device may be designed to possess any desired time constant from 40 seconds to one hour.

The unbalancing of the bridge circuit 33 is not proportional to the input signal potential appearing at winding 7 which is applied to the grid 9 of amplifier tube 10; therefore, the bridge voltage developed by the unbalanced condition is not a function of the input signal. The development of the bridge voltage within a given period of time constitutes an integration solely with respect to time; it bears no relation to the linear integral of the input signal potential. The arrangement for controlling the rate of change of the bridge voltage so that such voltage will constitute the linear integral of the input signal potential with respect to time is provided by the remaining portion of the circuit now to be described.

The diagonal formed by the center tap 34T of resistor 34 and the junction 33J of the resistors 31 and 32 connects by means of leads 35 and 36, respectively, to the primary winding 37 of a transformer 38 and to the primary winding 39 of a transformer 40. A lead 41 then connects these primary windings 37 and 39 in series with each other.

The output of the integration circuit is derived from the secondary winding 42 of transformer 38 by way of leads 42A and 42B.

The output of the secondary winding 43 of transformer 40 is impressed by means of a lead 44 upon the grid 45 of an amplifier tube 46. The plate 47 of amplifier 46 connects through a by-pass condenser 49 to the grid 50 of an amplifier tube 51. Energization for the plate 52 of amplifier 51 is provided by a suitable source of alternating current potential. A resistor 54 shunted by a filter condenser 55 is connected in series with the cathode 53 of tube 51.

The input of a magnetic inverter amplifier 58 is connected by means of lead 56, lead 57, condenser 59, and lead 57A across resistor 54. The magnetic inverter amplifier 58 is fully described and claimed in copending application Serial No. 700,234, filed September 30, 1946 now Patent No. 2,678,419, issued May 11, 1954 by Alfred Bennett, one of the co-inventors of the integrating circuit of this invention. In response to the weak direct current signal received by way of leads 56 and 57, magnetic inverter 58 develops a workable alternating current potential at its output lead 60 whose amplitude and polarity is responsive to that of the input. The lead 60 connects the output of magnetic inverter amplifier 58 in series opposition with the secondary winding 7 of input transformer 6.

The bridge voltage resulting from the unbalancing of bridge circuit 33 is impressed upon the primary winding 39 of transformer 40, is amplified by tube 46 and is then applied to the grid 50 of tube 51. The voltage on the grid 50 permits a greater or a smaller cathode current to flow. The cathode current flow, in turn, produces across resistor 54 a responsive voltage drop of a unidirectional pulsating character.

The charging action of condenser 55 eliminates the pulsating character from the voltage drop across resistor 54. The voltage drop across resistor 54 establishes a charge upon condenser 59 that is responsive at all times to the voltage of bridge 33. In response to the variation of the bridge voltage, the magnitude of the charge on condenser 59 rises or falls producing a charging current which flows through the input of magnetic inverter amplifier 58. The variation of the bridge voltage occurs so slowly that the resulting magnitude and the rate of change of the charging current of condenser 59 is rendered very small.

The instantaneous voltage across resistor 54 that is impressed upon the circuit comprising condenser 59 and the input circuit of magnetic inverter amplifier 58 may be expressed in the form of the following equation:

$$(1) \qquad e=\frac{idt}{C}+iR+L\frac{di}{dt}$$

where:

$e$=the voltage drop across resistor 54
$i$=the charging current of condenser 59
$C$=the capacitance of condenser 59
$R$=the resistance of the input circuit of magnetic inverter amplifier 58
$L$=the inductance of the input circuit of magnetic inverter amplifier 58.

When the magnitude and the rate of change of the charging current are very small, the terms "$iR$" and $$L\frac{di}{dt}$$

of Equation 1 become very small and may be eliminated without creating any appreciable error. Equation 1 is reduced to $$(2) \qquad e=\frac{idt}{C}$$

From Equation 2, we find that the voltage drop across resistor 54 becomes proportional to the linear integral of the charging current of condenser 59. The charging current then is proportional to the rate of change of the voltage drop across resistor 54 and consequently to the rate of change of the bridge voltage.

The charging current of condenser 59 flowing through the input of magnetic inverter amplifier 58 causes a rate potential to be developed in the output lead 60 which is proportional to the rate of change of the voltage of bridge 33. The rate potential is fed back in series with and in opposition to the input signal impressed upon the primary winding 5 of the input transformer 6.

As the bridge voltage increases toward its maximum limit, the rate potential increases until it is exactly equal to the input signal and the input signal is washed out. At this point, the potential applied to grid 9 of amplifier tube 10 equals zero, consequently, cutting off the operation of discriminator tube 16 so that the heaters of thermal device 23 cease to be driven. The increasing bridge voltage begins to slow down causing the rate potential to decrease. Upon the decay of the rate potential, the input signal takes charge again, and the heaters of thermal device 23 are driven to increase the bridge voltage until a rate potential again is produced equal to the input signal whereupon operation is again cut off. This cycle-like process is repeated until the bridge voltage has reached its maximum limit whereupon the rate potential drops to zero since there can be no further change in bridge voltage. Although the process probably takes place in steps, the output because of the thermal inertia of the third time delay tube, is a smoothly increasing or decreasing signal.

The limitation of the rate potential by the input signal so that at all times the rate potential is just sufficient to wash out the input signal effects a control upon the rate of change of the bridge voltage. As the input signal varies, the rate potential necessary to oppose and neutralize it must vary accordingly. For low input signals, low rate potentials suffice; for higher input signals, higher rate potentials are necessary. The rate of change of the bridge voltage, which is proportional to the rate potential thus becomes proportional to the input signal. In other words, the bridge voltage becomes proportional to the linear integral of the input signal with respect to time. Thus, until the bridge voltage attains its maximum limit, the output derived from the secondary winding 42 of the transformer 38 constitutes the linear integral of the input signal with respect to time.

For any input, the output will eventually reach circuit saturation. The time that must elapse before saturation is reached, of course, will be inversely proportional to input. While any minimum signal will drive the thermal time delay tube to a maximum, the rate potential feed back, washing out the input signal, determines the rapidity with which the limit is reached. As explained above, the higher the input potential, the higher must be the rate potential to wash out the input signal.

In case of zero input signal, the output level is maintained by the rate potential alone. As the bridge starts to return to balance, the polarity of the rate potential reverses and drives the bridge voltage up again. As soon as the decay of the bridge voltage is arrested and an increase is started, the rate potential reverses its polarity and acts to drive the bridge voltage down again. Thus, with no input signal, the rate potential causes the system to oscillate about the attained output level for a considerable period of time.

As will now be apparent to those skilled in the art, a novel and desirable electronic integrating circuit has been provided capable of performing linear integrations with respect to intervals of time involving time period constants, which are for a time persistence not obtainable by the heretofore known types of electronic circuits and which compare favorably with integrations for those periods of time persistence that are obtainable from mechanical integrating devices.

Although but one embodiment of the invention has been illustrated and described in detail, various changes and modifications in the form and relative arrangement of parts, which will now appear to those skilled in the art, may be made without departing from the scope of the invention.

What is claimed is:

1. Apparatus for producing electric potential variations that are the integrated value of electric potential variations from a given source, comprising an amplifier having input and output circuits, means for applying the electrical potential variations to be converted to the input circuit of the amplifier, a phase responsive electron discharge device having input and output circuits, a connection between the output circuit of the amplifier and the input circuit of the phase responsive electron discharge device, a normally balanced Wheatstone bridge network having thermally responsive resistors constituting two adjacent branches, said Wheatstone bridge being energized across one pair of diagonal terminals by an alternating current potential, a means for thermally changing the resistance value of said resistors, connections from the output circuit of the phase responsive electron discharge device to the thermal changing means, a second amplifier having input and output circuits, connections from the second pair of diagonal terminals of the Wheatstone bridge to the input circuit of the second amplifier, a cathode resistor shunted by a condenser in the output circuit of the second amplifier, and a feedback circuit from the output circuit of the second amplifier to the input circuit of the first amplifier, said feedback circuit comprising a second condenser and an amplifying means serially connected to provide a feedback voltage to the input circuit of the first amplifier proportional to the rate of change of the electrical variations developed across the second pair of diagonal terminals of the Wheatstone bridge that is just sufficient to wash out the electrical potential variations to be integrated whereby a control is effected upon the said rate of change so that the electrical variations developed across the second pair of diagonal terminals of the Wheatstone bridge constitute the time integral of the electrical potential variations applied to the input circuit of the first amplifier, and output means for utilizing the electrical variations developed across the second pair of diagonal terminals of the Wheatstone bridge.

2. An integrating circuit adapted for delivering an output voltage substantially linearly proportional to the time integral of its input voltage comprising a normally balanced thermally responsive Wheatstone bridge network having slow acting thermally varied resistors constituting two adjacent branches thereof, means responsive to the phase of the input voltage for selectively modifying the magnitudes of the resistance values of said resistors to unbalance said bridge circuit thereby establishing a slowly and progressively build-up voltage across the second pair of diagonal terminals of said bridge circuit, a thermionic tube having a plate, grid, and cathode, a means to impress the built-up voltage on the grid to control the electron flow from cathode to plate, a capacitance connected to said cathode so that the magnitude of the charge on the capacitance varies with said electron flow, a means responsive to the change in magnitude of the charge on said capacitance for developing an alternating signal voltage, a means for feeding back in series opposition with the input voltage said alternating signal voltage just sufficient to wash out the input voltage whereby control is effected upon the rate of change of said bridge voltage that the said bridge voltage becomes substantially linearly proportional to the time integral of the input voltage, and means at the second pair of diagonal terminals of the Wheatstone bridge for obtaining the bridge voltage.

3. An integrating circuit adapted for delivering an output voltage substantially linearly proportional to the time integral of its input voltage, comprising a normally balanced Wheatstone bridge, circuit means responsive to the phase of the input voltage for selectively unbalancing the said bridge circuit to establish a time retarded bridge voltage across a diagonal of said bridge circuit, a capacitance, a means for developing a charge on said capacitance that is responsive to the rate of change of the said bridge voltage, a means responsive to said charge for developing and feeding back a voltage in series opposition with the input voltage that is just sufficient to wash out the input voltage whereby control is effected upon the rate of change of said bridge voltage so that said bridge voltage becomes substantially linearly proportional to the time integral of the input voltage, and means at a diagonal of the Wheatstone bridge for obtaining the bridge voltage.

4. An electrical circuit for performing a linear integration, comprising a signal input means for inserting the signal into said circuit, a Wheatstone bridge, thermal means responsive to said input signal to unbalance said bridge to develop an unbalance voltage, a thermionic means, a means responsive to the condition of said bridge to control current flow through said thermionic means, a capacitance, a means responsive to said current flow for varying the electrical charge on the capacitance, and a means responsive to the electrical charge on the capacitance for developing a signal of a magnitude corresponding to the original input signal, and a means to feed said signal back in phase opposition to the incoming signal whereby the signal appearing is a result of the bridge unbalance represents the rate of change in the input signal during the interval required to unbalance the Wheatstone bridge.

5. Electrical apparatus comprising an amplifier having an input for receiving a control signal and an output, a normally balanced electrical device having an output and an input controlled by the output of the amplifier, said device being unbalanced by said amplifier to provide a signal at its output which builds up to a constant level over a predetermined time interval, control means having an output and an input connected to the output of said device, a signal being developed at the output of said control means corresponding to the rate of change of the output of said device, and means connecting the output of said control means in series opposition with the input of said amplifier to thereby modify the output of said device.

6. Electrical apparatus comprising an amplifier having an input for receiving an alternating current control signal and an output, a normally balanced electrical device having an output and an input controlled by the output of the amplifier, said device being unbalanced by said amplifier to provide an alternating current signal at its output which builds up to a constant level over a predetermined time interval, control means having an output and an input connected to the output of said device, a direct current signal being developed at the output of said control means corresponding to the rate of change of the output of said device, a magnetic amplifier controlled by said direct current signal and developing an alternating current control signal, and means communicating said last-named alternating current signal to the input of said first amplifier in opposition to said first alternating current control signal to thereby modify the output of said device whereby the latter is a true integral of the first alternating current control signal.

7. An electrical integrating circuit comprising an amplifier having an input for receiving a control signal and an output, a normally balanced network having thermally responsive portions, means in heat exchange relationship with said portions and thermally affected by said output so that said network is unbalanced by said amplifier output to provide a signal at its output which builds up to a constant lever over a predetermined time interval, signal developing means responsive to the network signal build-up for developing a signal corresponding to the rate of change of said network signal, and summation means for comparing the last named signal and said first named signal whereby only the resultant signal appears at the input of said amplifier and the output of said balanced network is the integral of said output to the amplifier.

8. Electrical apparatus comprising a phase discriminator having an input for receiving an alternating current control signal of variable phase and an output for each phase, a normally balanced electrical network having an input for receiving the output of said discriminator and being capable of developing at its output an alternating current signal which builds up to a constant level over a predetermined time interval, a second signal developing means responsive to the signal from said balanced network for developing a signal corresponding to the rate of change of the output signal from said balanced network, and a means to feed back said last named signal to said discriminator input in phase opposite to said control signal.

9. Electrical apparatus comprising an amplifier having an input for receiving an alternating current control signel and an output, a normally balanced Wheatstone bridge having an output and an input that is controlled by the output of said amplifier, said Wheatstone bridge being unbalanced by said amplifier output to provide an alternating current signal at its output which builds up to a constant level over a predetermined time interval, control means having an output and an input that is connected to the output of said Wheatstone bridge, said control means developing a direct current signal at its output corresponding to the rate of change of the output of said Wheatstone bridge, a magnetic amplifier controlled by said direct current signal and developing an alternating current control signal, and means communicating said last-named alternating current control signal to the input of said first alternating current control signal to thereby modify the output of said Wheatstone bridge whereby the latter is a true integral of the first alternating current control signal.

References Cited in the file of this patent

UNITED STATES PATENTS

| | | |
|---|---|---|
| 2,251,973 | Beale et al. | Aug. 12, 1941 |
| 2,449,035 | Coffin et al. | Sept. 7, 1948 |
| 2,455,618 | Shepard | Dec. 7, 1948 |
| 2,463,553 | Oleson | Mar. 8, 1949 |
| 2,478,203 | McCoy | Aug. 9, 1949 |
| 2,524,053 | Halpert | Oct. 3, 1950 |
| 2,533,587 | Kittredge | Dec. 12, 1950 |
| 2,542,160 | Stoner et al. | Feb. 20, 1951 |
| 2,680,193 | Noxon | June 1, 1954 |
| 2,703,203 | Bishop | Mar. 1, 1955 |